United States Patent [19]

Hanson

[11] Patent Number: 4,961,279
[45] Date of Patent: * Oct. 9, 1990

[54] METHOD OF BAIT MOUNTING

[76] Inventor: Harold C. Hanson, Box 479 Will St., Mahomet, Ill. 61853

[*] Notice: The portion of the term of this patent subsequent to Jul. 18, 2006 has been disclaimed.

[21] Appl. No.: 359,204

[22] Filed: May 31, 1989

Related U.S. Application Data

[63] Continuation of Ser. No. 928,972, Nov. 10, 1986, Pat. No. 4,848,024, which is a continuation of Ser. No. 855,121, Apr. 23, 1986.

[51] Int. Cl.$^5$ .............................................. A01K 83/00
[52] U.S. Cl. .................... 43/43.16; 43/44.2; 43/44.8
[58] Field of Search ................. 43/4, 44.8, 44.2, 44.82

[56] References Cited

U.S. PATENT DOCUMENTS

| | | | |
|---|---|---|---|
| 1,915,876 | 6/1933 | Wallace | 43/4 |
| 2,821,046 | 1/1958 | Fisk | 43/44.2 |
| 2,880,545 | 4/1959 | Stadler | 43/4 |
| 3,050,896 | 8/1962 | Parker | 43/44.2 |
| 3,521,395 | 7/1970 | Klemkowski | 43/4 |
| 3,738,048 | 6/1973 | Duchscher | 43/44.8 |
| 4,625,451 | 12/1986 | Griffiths | 43/44.2 |

Primary Examiner—Kurt Rowan
Attorney, Agent, or Firm—Willian Brinks Olds Hofer Gilson & Lione

[57] ABSTRACT

An improved fishing device and method comprising a shank, a rearwardly located means for attaching fishing lines, one or more forwardly located fishhooks, and a forwardly located bait restraining means, such as a forward-facing hook. The device is preferably inserted, rearward end first, into the mouth of a bait fish such that the rearward portion and bait restraining means lie within the bait, and the fishhook or fishhooks protrude from the point of insertion. The bait restraining means is then engaged with the bait such that when the device is pulled in a forward direction by a fishing line, the bait remains secured to the device yet is substantially uninjured and unimpaired by the device.

8 Claims, 1 Drawing Sheet

METHOD OF BAIT MOUNTING

This is a continuation of application Ser. No. 07/928,972, filed Nov. 10, 1986, now U.S. Pat. No. 4,848,024, which was a division of Ser. No. 06/855,121, filed Apr. 23, 1986.

FIELD OF THE INVENTION

The present invention relates to a method and apparatus for catching game fish with preferably live bait fish. More particularly, the invention relates to a method and apparatus which uses a mounting means to secure an improved fishhook inside the bait wherein the attached fishing line and one or more hooks protrude from the point of insertion.

BACKGROUND OF THE INVENTION

Numerous fishhooks with means for securing bait thereto are found in the prior art. However, many of these known devices have significant disadvantages. For example, many require the bait to be impaled on a game hook or other restraining means in a manner that can injure the bait or inflict pain. Consequently the bait either soon dies or is so affected or restricted in movement that it presents an unnatural appearance. Further, known fishing devices typically have significant amounts of hardware surrounding the bait. Such external hardware not only may produce an unnatural appearance to the bait, but may also cause an unnatural feel of the bait fish to the game fish during a strike.

Many known devices are also prone to becoming embedded deep within the game fish, which can not only cause significant injury to the game fish, but also make extracting the device from the game fish difficult. Further, known devices and techniques have proved disappointing with certain fishing techniques and when used for certain difficult to hook game fish, such as muskellunge and other North American pike. Many are also prone to being snagged by underwater obstructions, making use with certain techniques difficult.

It is therefore an object of this invention to provide a fishing device which holds bait without causing the bait to move unnaturally. A related object is to provide a fishing device which will not do significant injury to the bait. Another object is to provide a fishing device which can be used without surrounding the bait with significant external hardware.

A further object is to provide a device and method which fascilitate successful hooking of desired game fish, while reducing injury to game fish. Another object of this invention is to provide a fishing device which is substantially weedless. Finally, it is a general object to provide such a device which is relatively inexpensive to manufacture, and easy to use. Other objects and features of the invention will become apparent to those skilled in the art from the following specification when read in light of the attached drawings.

SUMMARY OF THE INVENTION

The present invention relates to an improved fishing device which includes a shank having means for attaching fishing line at or near its rearward end, at least one fishhook at or near its forward end, and a mounting means near the forward end. The rearward end of the shank with the means for attaching fishing line is adapted to be inserted preferably inside of a bait fish, such as into the mouth cavity or gullet through its mouth. In the preferred embodiment, the game fishhooks remain outside of the bait fish and point rearward relative to the bait. To secure the device within the bait fish, the mounting means preferably engages the lip of the bait to prevent the device from being expelled and to permit the bait to be manipulated in a forward direction by the fishing line. The mounting means engages the bait fish without significantly impairing its natural movement.

The present invention further relates to a method of attaching bait to a fishing line wherein the line is attached to the back end of a fishing device. The back end is then inserted into the bait, such as through the mouth of a bait fish. Hooks at the opposite, front end of the fishing device remain outside of the bait. A forward-facing mounting means near this front end is then engaged with the bait, preferably to its lip from the inside. As a result, the fishhooks and fishing line protrude from the point of insertion, while the remaining protions of the device are located within the mouth cavity of the bait fish itself.

DESCRIPTION OF THE PREFERRED EMBODIMENT

Figure 1:
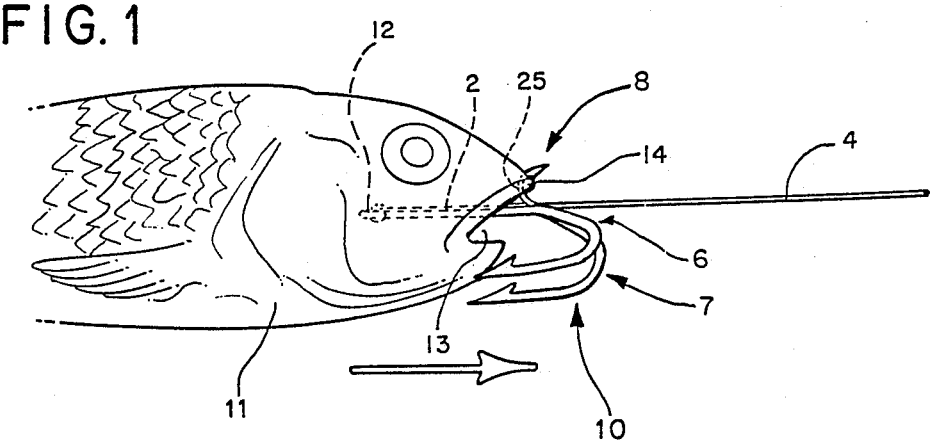
FIG. 1 is a side elevational view of one embodiment of the present invention with live bait attached.
Figure 2:
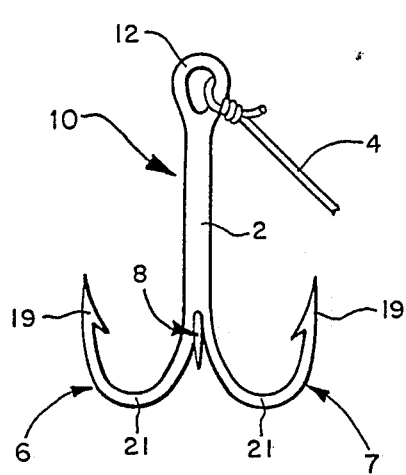
FIG. 2 is a top plan view of a preferred embodiment of the present invention.
Figure 3:
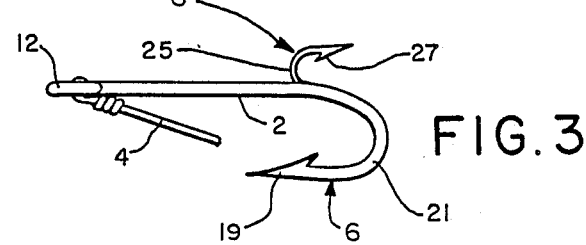
FIG. 3 is a side view of the embodiment of FIG. 2.

Referring now to the drawings, wherein like reference numerals designate like or corresponding parts throughout the several views, there is shown in FIG. 1 a preferred embodiment of the fishing device 10 with a bait fish 11 secured thereto. More particularly, as shown in FIGS. 2, 3 a shank 2 terminates rearwardly into an eyelet 12 to which a flexible member such as fishing line 4 is attached. Other means for attaching fishing line to a fishing device may similarly be used, either at or proximate to the rearward end of shank 2, including snaps, swivels, and including leaders or other such flexible members.

A plurality of game fishhooks 6, 7 are attached to the forward end of shank 2. The fishhooks 6, 7 comprise an end portion 19, and a nonlinear middle portion 21. The end portion 19 preferably defines a point and may include a barb or similar restrictive means. The nonlinear middle portion 21 may be curved as in a traditional fishhook, bent or otherwise turned such that once the end portion 19 engages the game fish, the pulling force of the game fish will typically not allow it to be pulled back out of the game fish through the point of entry.

A bait mounting means 8 is also provided, comprising a middle protion 25, and an end portion 27 defining a point. The end portion 27 of the bait mounting means 8 may also comprise a barb or other restrictive means. Furthermore, the middle portion 25 of the bait mounting means 8 is rearward to the end portion 27. Thus, when the fishing line is pulled forward in the direction of the arrow in FIG. 1, the portion of the bait fish engaged by the bait mounting means 8 will seat against the middle portion 25 and prevent the bait from slipping off of the device 10.

In a presently preferred embodiment, bait mounting means 8 comprises a hook which is attached in a forward-facing direction to shank 2 by soldering or other known methods. This mounting hook is generally smaller than the game fishhoks 6, 7.

Figure 4:
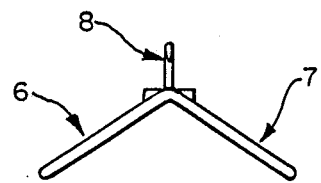
FIG. 4 is an end view of the embodiment of FIG. 2.

As viewed in FIG. 4, game fishhooks 6 and 7 in a preferred embodiment may diverge with respect to the medial, vertical plane. Bait mounting means 8 in a preferred embodiment lies in the medial, vertical plane extending away from the fishhooks 6, 7. It is understood, however, that other arrangements are possible, such as locating the mounting means 8 between fishhooks 6, 7, or rotatably mounting the mounting means 8 to the shank 2 to permit limited or full rotation about shank 2.

Although the preferred emboidment comprises two game fishhooks, other numbers of game fishhooks are also possible. If only one hook is used, the bait would have less hardware protruding from it, and this would give the bait a more natural appearance. However, as the game fish attempts to eat the bait, the single hook is typically less efficient in hooking the game fish than a larger number of hooks. When more than one fishhook is used, the fishhooks should preferably be spaced away from each other as in FIG. 4.

Figure 5:
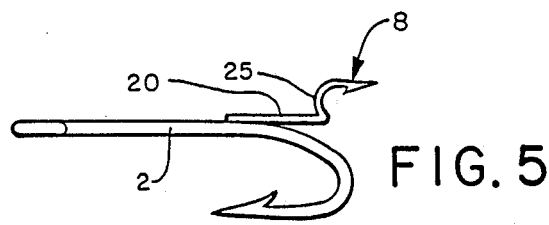
FIG. 5 is a side view of another embodiment of the present invention.
Figure 6:
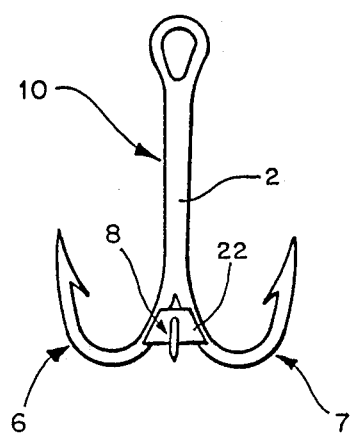
FIG. 6 is a top view of another embodiment of the present invention.

FIGS. 5 and 6 disclose alternative embodiments of the invention, wherein the portion of the bait mounting means 8 which engages the bait fish 11 is located forward to shank 2. As shown in FIG. 5, an extension 20 may be added to the mounting means 8. In other embodiments as represented by FIG. 6, a means for mounting the mounting means 8 is provided which may be forward of shank 2. For example, a bridge 22 or other means may be attached to one or more of the hooks, at or forward of shank 2, and the bait mounting means 8 attached thereto. In use, the fishhooks 6, 7 are therefore positioned closer to the body of the bait fish 11, which may provide a more natural appearance.

Figure 7:
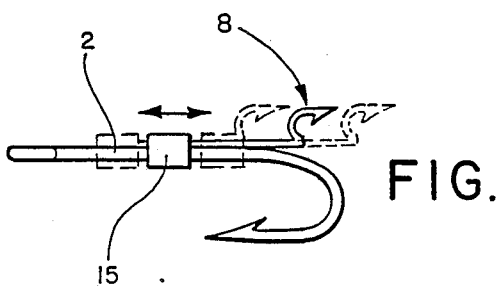
FIG. 7 is a side view of another embodiment of the present invention.

Alternatively, in other embodiments the bait mounting means 8 may be positioned further down the shank 2 such that, in use, game fishhooks 6, 7 extend further forward, causing the fishhooks to protrude further from the bait fish. FIG. 7 discloses an embodiment of the invention having an adjustable attachment means 15 which adjustably secures the bait mounting means 8 at selectable locations relative to shank 2, to permit a variety of configurations and to permit adjustments to differing bait fish.

Figure 8:
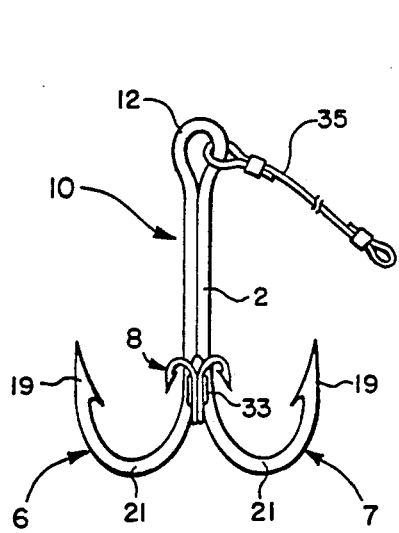
FIG. 8 is a top plan view of another preferred embodiment of the present invention wherein the bait mounting means comprises two forward-facing hooks.
Figure 9:
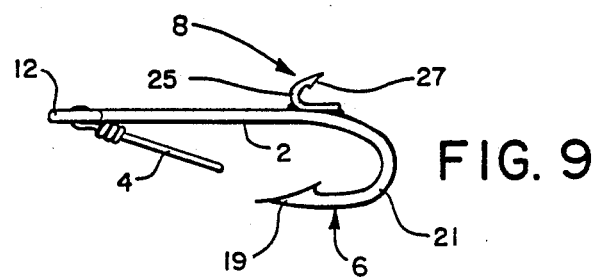
FIG. 9 is a side view of the embodiment of FIG. 8 showing substantially forward-facing hooks substantially open in the forward direction.
Figure 10:
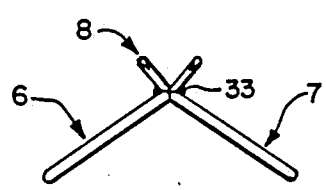
FIG. 10 is an end view of the embodiment of FIGS. 8 and 9.
Figure 11:
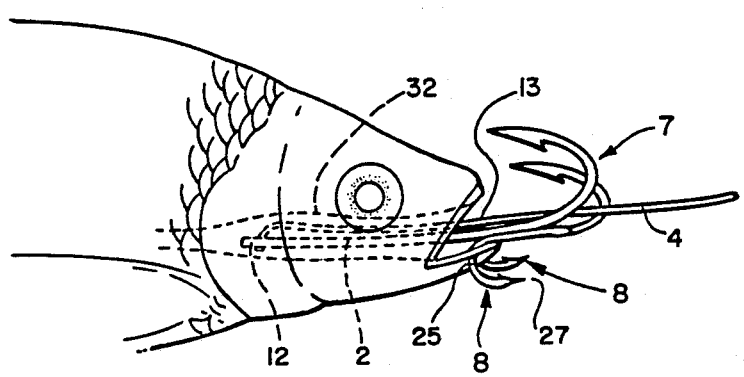
FIG. 11 is a side view of the embodiment of FIGS. 8-10 with a bait fish attached.

In use, and referring to FIG. 1, and 11 the fishing line 4 or other flexible member such as leader 35 (FIG. 8) is attached to the line attaching means, such as eyelet 12 or other attaching means such as a 35 (FIG. 8) If some other flexible member such as a leader 35 is used to attach the fishing line to the device, the fishing line is attached to the free end of the flexible member in manners known in the art. Eyelet 12 and shank 2 are then preferably inserted into the mouth of the bait fish until the bait mounting means 8 is just inside the bait fish's mouth 13. The bait mounting means 8 is then lifted and pulled forward such that the pointed end portion 27 of the bait mounting means 8 engages the bait, such as upper lip 14, generally from the inside out. Other points of attachment are similarly possible. When installed in this manner, the flexible member attached to the device (such as line 4 or leader 35) passes back through the mouth 13 from the inside of the bait out, as shown in FIGS. 1 and 11.

When the bait mounting means is attached in this preferred manner, the shank and eyelet lie in the mouth cavity 32, gill area, or gullet of the bait fish. Only the bait mounting means penetrates the body of the bait fish, and this penetration is preferably done to the upper or lower lip of the bait fish which are typically not sensitive to pain. As a result, the bait fish is free from significant pain which might otherwise affect its natural movement.

Furthermore, because a significant portion of the device is internal, there is a little hardware surrounding the bait fish. This leads to a more natural movement of the bait, and provides a more natural "feel" to a game fish during a strike, particularly to game fish which typically "mouth" bait before ingesting it.

Finally, in th preferred embodiment shown, the game fishhooks point in a direction substantially opposite to the pull of the fishing line. As a result, the fishing device is substantially weedless and amenable to many fishing techiques and to use in otherwise difficult structrue and cover.

When the game fish takes the bait into its mouth and the fisherman "sets"the hook, the resulting pull of the fishing line 4 will cause the device 10 including shank 2 to pivot slightly. As a result, the game fishing hooks 6, 7 generally engage the inner mouth parts of the game fish. If the game fish reacts, the resulting jerking motion will facilitate setting of the hook.

Hooking a game fish by this method has significant advantages. First, it has been observed that fish caught using the present invention are more likely to be hooked in the mouth region, rather than in the gullet. Thus, the game fish is not significantly harmed, and may be successfully released. Second, smaller fish typically are less prone to get ensnared by this device, thus increasing the percentage of desirable strikes. Finally, notable success in hooking difficult game fish, such as muskellunge, has been achieved.

The preferred bait for this invention is live bait fish. However, a variety of baits can be used, including artificial bait fish and non-living bait fish.

It should be understood that the foregoing disclosure relates to only the preferred embodiments of the invention, and that numerous modifications or alterations may be made therein without departing from the spirit and scope of the invention. By way of example only, more than one bait mounting means 8 may be provided. For example, a preferred embodiment in which the bait mounting means 8 includes two forward-facing hooks is shown in FIGS. 8-11. The means for attaching the bait mounting means to the fishing device may provide offset relative to the medial vertical plane, or may permit degrees of freedom to the mounting means, such as rotation about the shank or a degree of lateral displacement relative to the shank. The present embodiments are, therefore, to be considered in all respects as illustrative and not restrictive, and all changes which come within the meaning and range of equivalents of the claims are intended to be embraced therein.

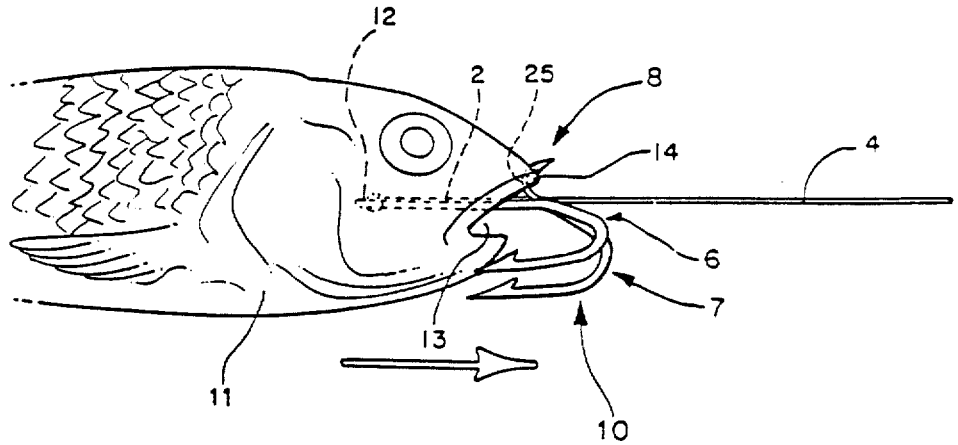

I claim:

1. Method of mounting a fishing device having at least one game fish hook proximate its forward end and a line attaching means at its rearward end, to a bait, comprising the steps of:

inserting the rearward end portion of the fishing device including the line attaching means into said bait until a bait mounting means located proximate to the forward end portion of the fishing device is proximate to at least a portion of said bait, such that a flexible member attached to the line attaching means passes from the inside of the bait out through the point of insertion, said insertion beginning with said rearward end;

maintaining said at least one game fish hook substantially outside of said bait; and engaging said bait mounting means with said bait.

2. A method of attaching bait to a fishing line, said method comprising the steps of:

attaching said fishing line to a line attaching means cooperating with the rearward end portion of a fishing device, wherein the fishing device has at least one game fishhook located at its forward end portion;

inserting said line attaching means of said fishing device into said bait until a bait mounting means located proximate to the forward end portion of fishing device is proximate to at least a portion of said bait, said insertion beginning with said rearward end portion and said line attaching means of said fishing device remaining entirely within said bait; and engaging said bait mounting means with said bait.

3. The method of claim 2 wherein said step of engaging said bait mounting means further comprises engaging a forward-facing hook with said bait.

4. The method of claim 2 wherein said step of engaging said bait mounting means further comprises engaging two forward-facing hooks with said bait.

5. A method of mounting a bait fish having a mouth cavity to a fishing device having an eyelet at the first end of a shank for attaching the device to a flexible member, one or more game fishhooks at the second end of the shank, and a bait mounting means facing away from the eyelet located at the intersection of the game fishhooks and the shank, including the steps of:

attaching the device to a fishing line;

inserting the eyelet with the flexible member attached to it into the mouth of the bait fish so that the eyelet and at least a protion of the shank are within the mouth cavity, until the bait mounting means is proximate to a portion of the mouth of the bait fish, said insertion beginning with said eyelet;

Then engaging the bait mounting means to the bait to retain the eyelet and at least a portion of the shank inside of the mouth cavity, such that the flexible member passes out from the inside of the mouth cavity through the bait fish's mouth.

6. The method of claim 5 wherein the step of engaging a bait mounting means with the bait further comprises the step of engaging one or more bait mounting hooks facing away from the eyelet in a direction substantially opposite to that of the game fishhooks, with the mouth of the bait fish by passing said one or more bait mounting hooks through the lip of the bait from the inside out.

7. The method of claim 5 wherein said flexible member comprises fishing line, and wherein the step of attaching the device to a fishing line comprises attaching said fishing line to said eyelet.

8. The method of claim 5 wherein said flexible member comprises a leader having a first end cooperation with said eyelet and a second end, and wherein the step of attaching the device to a fishing line comprises attaching said fishing line to said second end of said leader.

* * * * *

UNITED STATES PATENT AND TRADEMARK OFFICE
CERTIFICATE OF CORRECTION

PATENT NO. : 4,961,279

DATED : October 9, 1990

INVENTOR(S) : Harold C. Hanson

It is certified that error appears in the above-identified patent and that said Letters Patent is hereby corrected as shown below:

On the cover page, in the title of the invention, please delete "BATT" and substitute therefor --BAIT--.

In column 1, line 2, please delete "BATT" and substitute therefor --BAIT--.

The title page should be deleted to appear as per attached title page.

Signed and Sealed this

Fifth Day of January, 1993

Attest:

DOUGLAS B. COMER

*Attesting Officer*     *Acting Commissioner of Patents and Trademarks*

United States Patent [19]

Hanson

[11] Patent Number: 4,961,279
[45] Date of Patent: * Oct. 9, 1990

[54] METHOD OF BAIT MOUNTING

[76] Inventor: Harold C. Hanson, Box 479 Will St., Mahomet, Ill. 61853

[*] Notice: The portion of the term of this patent subsequent to Jul. 18, 2006 has been disclaimed.

[21] Appl. No.: 359,204

[22] Filed: May 31, 1989

Related U.S. Application Data

[63] Continuation of Ser. No. 928,972, Nov. 10, 1986, Pat. No. 4,848,024, which is a continuation of Ser. No. 855,121, Apr. 23, 1986.

[51] Int. Cl.⁵ .............................................. A01K 83/00
[52] U.S. Cl. ................................... 43/43.16; 43/44.2; 43/44.8
[58] Field of Search ............. 43/4, 44.8, 44.2, 44.82

[56] References Cited

U.S. PATENT DOCUMENTS

| | | | |
|---|---|---|---|
| 1,915,876 | 6/1933 | Wallace | 43/4 |
| 2,821,046 | 1/1958 | Fisk | 43/44.2 |
| 2,880,545 | 4/1959 | Stadler | 43/4 |
| 3,050,896 | 8/1962 | Parker | 43/44.2 |
| 3,521,395 | 7/1970 | Klemkowski | 43/4 |
| 3,738,048 | 6/1973 | Duchscher | 43/44.8 |
| 4,625,451 | 12/1986 | Griffiths | 43/44.2 |

Primary Examiner—Kurt Rowan
Attorney, Agent, or Firm—Willian Brinks Olds Hofer Gilson & Lione

[57] ABSTRACT

An improved fishing device and method comprising a shank, a rearwardly located means for attaching fishing lines, one or more forwardly located fishhooks, and a forwardly located bait restraining means, such as a forward-facing hook. The device is preferably inserted, rearward end first, into the mouth of a bait fish such that the rearward portion and bait restraining means lie within the bait, and the fishhook or fishhooks protrude from the point of insertion. The bait restraining means is then engaged with the bait such that when the device is pulled in a forward direction by a fishing line, the bait remains secured to the device yet is substantially uninjured and unimpaired by the device.

8 Claims, 2 Drawing Sheets